(12) United States Patent
Born et al.

(10) Patent No.: US 12,341,443 B2
(45) Date of Patent: Jun. 24, 2025

(54) ROTARY PIEZOELECTRIC MOTOR, IN PARTICULAR FOR WATCHMAKING

(71) Applicant: The Swatch Group Research and Development Ltd, Marin (CH)

(72) Inventors: Jean-Jacques Born, Morges (CH); Yvan Ferri, Lausanne (CH); Alexandre Didier, Erlach (CH); Lionel Paratte, Marin-Epagnier (CH); Léonard Testori, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 333 days.

(21) Appl. No.: 18/074,886

(22) Filed: Dec. 5, 2022

(65) Prior Publication Data

US 2023/0198429 A1 Jun. 22, 2023

(30) Foreign Application Priority Data

Dec. 20, 2021 (EP) .................................. 21216102

(51) Int. Cl.
*H02N 2/10* (2006.01)
*G04C 3/12* (2006.01)
*H02N 2/12* (2006.01)

(52) U.S. Cl.
CPC .............. *H02N 2/103* (2013.01); *G04C 3/12* (2013.01); *H02N 2/123* (2013.01)

(58) Field of Classification Search
CPC ........ H02N 2/103; H02N 2/123; H02N 2/105; H02N 2/101; G04C 3/12
See application file for complete search history.

(56) References Cited

U.S. PATENT DOCUMENTS

| | | | |
|---|---|---|---|
| 5,343,108 A | 8/1994 | Miyazawa et al. | |
| 6,211,599 B1 | 4/2001 | Barnes et al. | |
| 10,488,823 B2 * | 11/2019 | Sarchi | G04B 19/25333 |
| 2006/0001331 A1 | 1/2006 | Nagahama | |
| 2006/0175929 A1 * | 8/2006 | Sawada | H02N 2/004 310/312 |

FOREIGN PATENT DOCUMENTS

| | | |
|---|---|---|
| DE | 692 04 332 T2 | 4/1996 |
| WO | 2006/097491 A1 | 9/2006 |

OTHER PUBLICATIONS

French Search Report for EP 21 21 6102, dated Jun. 2, 2022.

* cited by examiner

*Primary Examiner* — Emily P Pham
(74) *Attorney, Agent, or Firm* — Sughrue Mion, PLLC (57) ABSTRACT

A rotary piezoelectric motor (1), in particular for a timepiece, including a rotor (3) configured to rotate and actuate a mechanical device, and a stator (2) configured to rotate the rotor (3), the stator (2) including a piezoelectric actuator provided with a resonator (29) arranged to perform an oscillatory motion, and a fixed element (4). The resonator in a movable element (5) arranged at a distance from the fixed element (4) and connected to the fixed element (4), the piezoelectric actuator being configured to move the movable element (5) against the rotor (3) to make it rotate, the movement of the movable element (5) making the rotor (3) rotate in a first direction.

17 Claims, 6 Drawing Sheets

ROTARY PIEZOELECTRIC MOTOR, IN PARTICULAR FOR WATCHMAKING

CROSS REFERENCE TO RELATED APPLICATIONS

This application claims priority to European Patent Application No. 21216102.0 filed Dec. 20, 2021, the entire contents of which are incorporated herein by reference.

TECHNICAL FIELD OF THE INVENTION

The invention relates to the technical field of rotary piezoelectric motors. The invention also relates to the technical field of timepieces provided with such a rotary piezoelectric motor.

TECHNOLOGICAL BACKGROUND

Electric motors commonly used in watchmaking are "Laver"-type rotary motors, which operate based on electromagnetic physical principles. In general, such a motor includes a stator provided with windings and a magnetised rotor, which rotates by phase-shifted actuation of the windings.

However, these motors have a limited resistance to high magnetic fields. Starting from a given value of magnetic fields, the motor is blocked. In general, they are blocked under the effect of a magnetic field that exceeds 2 mT.

Thus, to avoid this problem, it is necessary to design motors operating based on other physical principles.

For example, there are electrostatic motors with combs, such as that one described in the patent CH709512. Yet the combs occupy much space, and they consume more energy than "Lavet"-type motors.

Motors based on the piezoelectric motors have also been developed, for example in the patent EP0587031. Yet the latter is limited to the actuation of a date. However, its high consumption and the risk of premature wear do not enable the drive of a second hand, which generally requires more energy.

SUMMARY OF THE INVENTION

The present invention aims to provide a rotary piezoelectric motor, which can withstand high electromagnetic fields, while keeping appropriate energy consumption and volume.

To this end, the invention relates to a rotary piezoelectric motor, in particular for a timepiece, the motor comprising:
a rotor configured to be able to rotate and actuate a mechanical device,
a stator configured to make the rotor rotate, the stator comprising a piezoelectric actuator provided with a resonator arranged to perform an oscillatory motion.

The invention is remarkable in that the stator comprises a fixed element and the resonator comprises a movable element arranged at a distance from the fixed element and connected to the fixed element, the piezoelectric actuator being configured to move the movable element against the rotor to make it rotate, the movement of the movable element making the rotor rotate in a first direction.

A stator having such a configuration allows transmission a rotational motion easily to the rotor thanks to a piezoelectric actuator. Indeed, the movable element can be moved in order to be in contact with the rotor to transmit a motion in a first direction. Thus, when the resonator oscillates, the movable element comes into contact with the rotor and transmits a force thereto to make it rotate in a first direction.

According to a particular embodiment of the invention, the resonator comprises at least one flexible arm, preferably two flexible arms, and possibly three or four flexible arms, connected by one end to the fixed element of the stator, and by another end to the movable element of the stator, preferably angularly distributed around the movable element.

According to a particular embodiment of the invention, the movable element performs an orbital motion in a second direction opposite to the first direction, when it is in contact with the rotor.

According to a particular embodiment of the invention, the movable element is always in contact with the rotor during the operation of the motor.

According to a particular embodiment of the invention, the movement of the movable element makes the rotor rotate continuously.

According to a particular embodiment of the invention, the movable element is immovable in rotation on itself.

According to a particular embodiment of the invention, the movable element has a ring-like shape, the rotor being arranged inside the ring.

According to a particular embodiment of the invention, the contact between the movable element and the movable rotor is inside the ring.

According to a particular embodiment of the invention, the rotor comprises a toothed wheel, the ring including an inner toothing cooperating with an outer toothing of the toothed wheel.

According to a particular embodiment of the invention, the arms perform a radial back-and-forth motion so as to make the movable element oscillate and move it.

According to a particular embodiment of the invention, the movable element is arranged around the rotor.

According to a particular embodiment of the invention, the arms are actuated by a signal phase-shifted by $2\pi/N$ between two consecutive arms, N being the number of arms.

According to a particular embodiment of the invention, the resonator oscillates at a frequency corresponding to its natural frequency.

According to a particular embodiment of the invention, the motor includes means for constant or temporal adjustment of the mechanical tension of each arm by a direct offset electrical voltage or by modification of the amplitude of alternating electrical voltages.

According to a particular embodiment of the invention, the rotor and/or the stator is obtained by micro-machining, for example from silicon or metal.

According to a particular embodiment of the invention, the rotor comprises flexible blades for holding gearing with the movable element in the event of an impact The invention also relates to a timepiece including a horological movement comprising a gear transmission configured to make at least one hand rotate, and comprising such a piezoelectric motor arranged so as to actuate the gear transmission.

BRIEF DESCRIPTION OF THE FIGURES

Other particularities and advantages will appear clearly from the following description made, for indicative and non-limiting purposes, with reference to the appended drawings, wherein.

DETAILED DESCRIPTION OF THE INVENTION

FIGS. 1 to 7 show a first embodiment of a rotary piezoelectric motor 1. In particular, the motor may be used in a timepiece to actuate a display device, like hands arranged on a dial. The piezoelectric motor 1 extends substantially in a plane.

The piezoelectric motor 1 comprises a rotor 3 movable in rotation on itself, and configured to be able and rotate and actuate a mechanical gear transmission, in particular for a display device. The piezoelectric motor 1 comprises a stator 2 configured to actuate the rotor 3 and make it rotate.

The rotor 3 comprises a toothed wheel 9 arranged at the centre of the piezoelectric motor 1. For example, the wheel 9 is mounted on an axis 13 provided with a pivot 15 at each end, these pivots being mounted in bearings 16 enabling the axis 13 to rotate. The wheel 9 includes an outer ring 28 and a hub 27 at the centre, the hub 27 being connected to the ring 28 by rigid spikes 19. The axis 13 includes a pinion 21 parallel to the wheel 9, and arranged to transmit the motion received by the wheel 9 to a gear transmission 17, for example to a movement of a timepiece. The wheel 9 is provided with a peripheral toothing 10 on the ring 28, which allows actuating the wheel. 9.

Preferably, the rotor 3 and/or the stator 2 comprise(s) silicon, preferably completely. Alternatively, the rotor 3 is made of metal so as to limit wear and frictions, when the stator 2 is made of silicon, and vice versa.

Still alternatively, by micromachining, the rotor 3 and/or the stator 2 comprises, preferably entirely, a material, such as quartz, Nickel (obtained by electrodeposition of a metal or by a LIGA-type process), or diamond (obtained by an ALD-type deposition).

Figure 1:
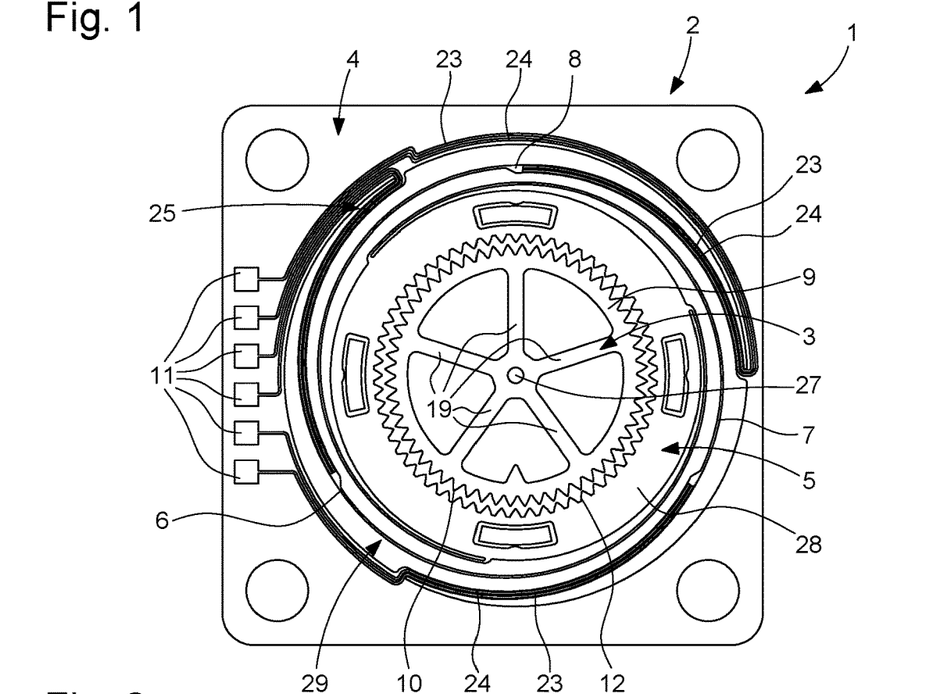
FIG. 1 schematically represents a top view of a first embodiment of the rotary piezoelectric motor according to the invention at stop, the rotor and the stator not being in contact, FIG. 2 schematically represents a top view of the first embodiment of the rotary piezoelectric motor according to the invention in operation, the rotor and the stator being in contact at 6 o'clock, FIG. 3 schematically represents a top view of the first embodiment of the rotary piezoelectric motor according to the invention in operation, the rotor and the stator being in contact at 9 o'clock, FIG. 4 schematically represents a top view of the first embodiment of the rotary piezoelectric motor according to the invention in operation, the rotor and the stator being in contact at 12 o'clock, FIG. 5 schematically represents a top view of the first embodiment of the rotary piezoelectric motor according to the invention in operation, the rotor and the stator being in contact at 3 o'clock, FIG. 6 schematically represents a bottom view of the first embodiment of the rotary piezoelectric motor according to the invention at stop, FIG. 7 schematically represents a sectional side view of the rotary piezoelectric motor according to the first embodiment of the invention, FIG. 8 schematically represents a top view of a second embodiment of a rotary piezoelectric motor according to the invention at stop, the rotor and the stator not being in contact, and FIG. 9 schematically represents a bottom view of the second embodiment of the rotary piezoelectric motor according to the invention, FIG. 10 schematically represents a top view of a third embodiment of a rotary piezoelectric motor according to the invention in operation, the motor undergoing an impact.

The stator 2 comprises an immovable fixed element 4 and a movable element 5 configured to actuate the wheel 9 of the rotor 3. The movable element 5 is arranged at a distance of the fixed element 4. The movable element 5 has a ring-like shape arranged around the rotor 3, the rotor 3 being arranged inside the ring. The movable element 5 is provided with an inner toothing 12 on the ring, the inner toothing 12 cooperating with the peripheral toothing 10 of the toothed wheel 9 to make it rotate. The ring is larger than the rotor 3 to be able to insert the rotor 3.

The fixed element 4 has a shape describing a circular inner space, within which the movable element 5 and the rotor 3 are arranged.

The stator 2 further comprises a piezoelectric actuator 25 integrated to a resonator arranged to perform an oscillatory motion, so as to generate an orbital motion at the movable element 5. The resonator comprises the movable element 5 and is connected to the fixed element 4.

The resonator comprises three flexible arms 6, 7, 8 connected to the fixed element 4 of the stator 2 by one end and connected to the movable element 5 of the stator 2 by the other end. The flexible arms 6, 7, 8 are angularly distributed around the movable element 5. Thus, with three arms 6, 7, 8, two consecutive arms are arranged with an angle of 120° therebetween.

Alternatively, according to other embodiments, the piezoelectric actuator comprises a resonator having two arms, and possibly four arms. With two arms, the angle is 180°, whereas with 4 arms, the angle is 90°.

The piezoelectric actuator is configured to move the movable element 5 against the rotor 3 to make it rotate. The arms 6, 7, 8 perform a radial back-and-forth motion so as to make the movable element 5 oscillate alternately in a substantially horizontal plane.

Preferably, the arms 6, 7, 8 are formed of a crystalline or polycrystalline material, for example of silicon, the arms 6, 7, 8 having a thickness enabling them to be deformed. The arms include piezoelectric material layers, so as to be able to be electrically activated. Each arm 6, 7, 8 comprises two piezoelectric material layers 23, 24 laterally juxtaposed, each layer 23, 24 being connected to a polarity opposite to the other. Each layer 23, 24 terminates on the fixed element 4 by a contact surface by which the voltage is supplied to the layer 23, 24, through an electric routing which is not represented in the figures.

Thus, by electrically activating the piezoelectric material layers 23, 24, the arms 6, 7, 8 are alternately deformed laterally in the direction of the centre and outwardly. The activation is produced with an alternating voltage.

Preferably, the motor 1 comprises means for adjusting the mechanical tension of each arm 6, 7, 8, in particular to be able to centre the orbital motion around the rotor 3, or else to slightly change the natural frequency of the motor 1. For example, the adjustment means are constant by an offset voltage. Alternatively, the adjustment means are temporal by the modification of the amplitude of alternating electrical voltages.

Each arm 6, 7, 8 describes a substantially circular arc, from an inner edge of the fixed element 4 up to an outer edge of the movable element 5. The arc describes an angle larger than 180°, and possibly larger than 250°. Thus, each arm surrounds a portion of the movable element 5. Two consecutive arms 6, 7, 8 are partially superimposed. The length of the arms 6, 7, 8 is selected as a function of the distance that the movable element 5 should cover.

The arms 6, 7, 8 are actuated by an alternating signal which may have a sinusoidal, square or trapezoidal shape. The signals transmitted to the arms 6, 7, 8 are phase-shifted by π/N between two consecutive arms, N being the number of arms.

Thus, the three arms 6, 7, 8 are activated simultaneously by a signal having a phase-shift of 120° between two consecutive arms 6, 7, 8. In the embodiments with two arms, the phase-shift is 180°, whereas with 4 arms, the phase-shift is 90°, and so on.

By the deformation of the piezoelectric layers, the arms are deformed. By actuating the arms 6, 7, 8, these perform an alternating radial back-and-forth motion, by getting close to and away from the centre of the motor, i.e. of the rotor 3. The end connected to the fixed element 4 does not move, but the end connected to the movable element 5 moves the most. Thus, the movable element 5 moves under the effect of the deformation of the arms 6, 7, 8.

The phase-shift between the arms 6, 7, 8 causes an orbital motion, preferably circular, of the movable element 5. The movable element 5 performs a circular motion, while remaining immovable in rotation on itself. Thus, the rotational motion is transmitted to the rotor 3 in one direction, as shown in FIG. 2.

Preferably, the motion of the movable element 5 is continuous, and makes the rotor 3 rotate continuously. To this end, the movable element 5 is always in contact with the rotor 3 during the operation of the motor. The contact between the movable element 5 and the rotor 3 is movable inside the ring.

FIGS. 2 to 5 show different successive time points at which, the point of contact P between the rotor 3 and the ring moves inside the ring. The orbital motion of the ring, whose internal space is larger than the rotor 3, generates a movable point of contact P between the ring and the rotor 3. A different portion of the inner toothing 12 of the ring meshes with the peripheral toothing 10 of the toothed wheel 9 at each time point. Thus, the rotor 3 is driven in rotation on itself.

Figure 2:
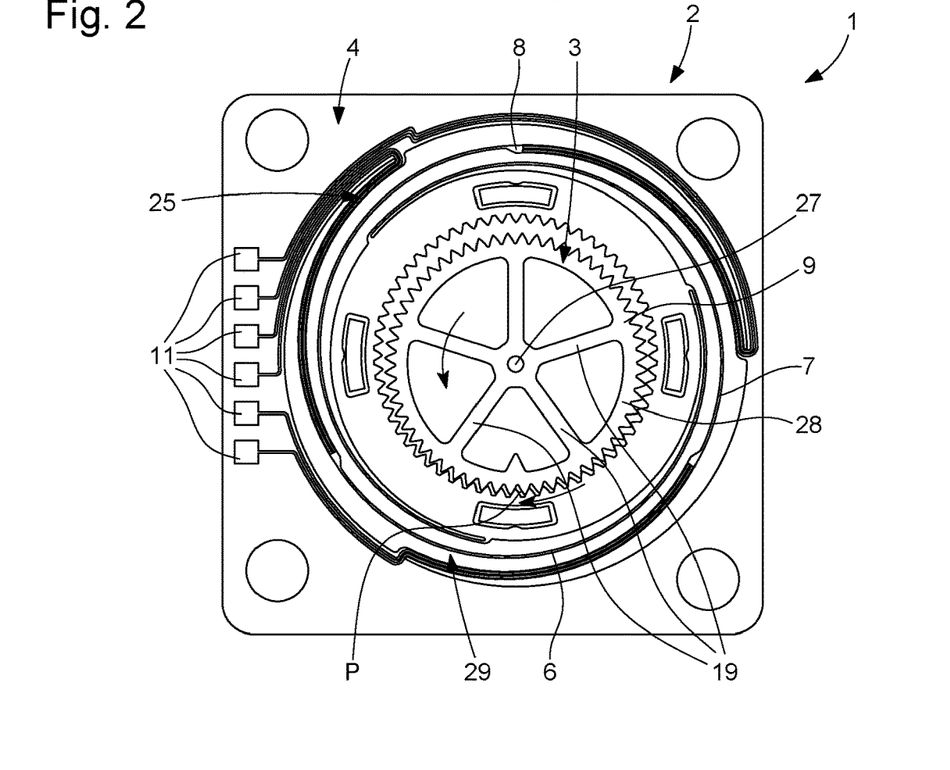
Figure 3:
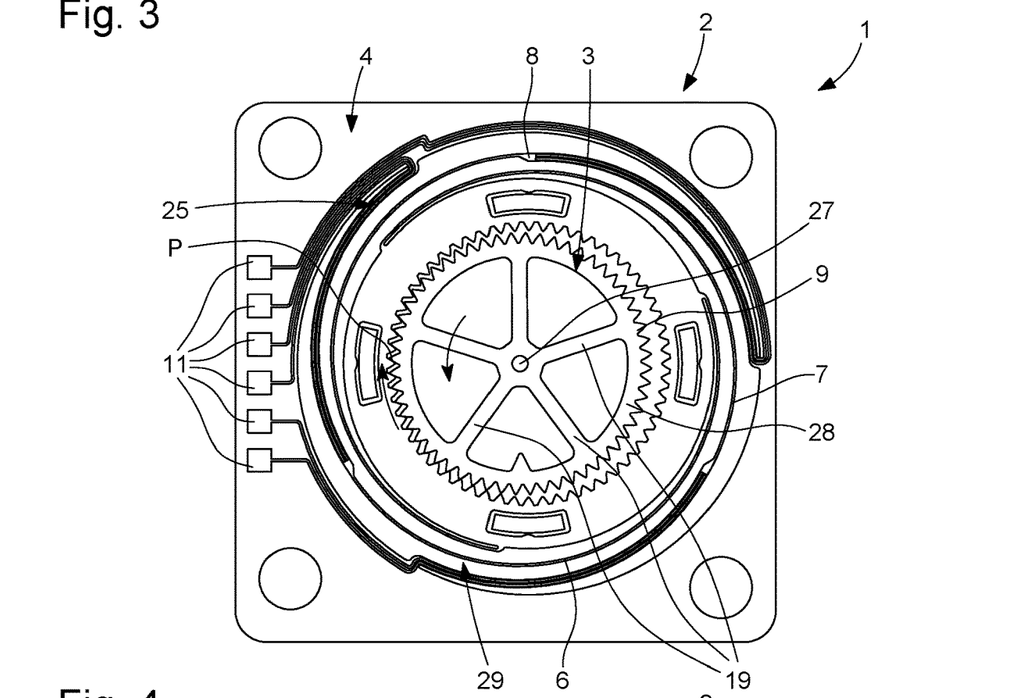
Figure 4:
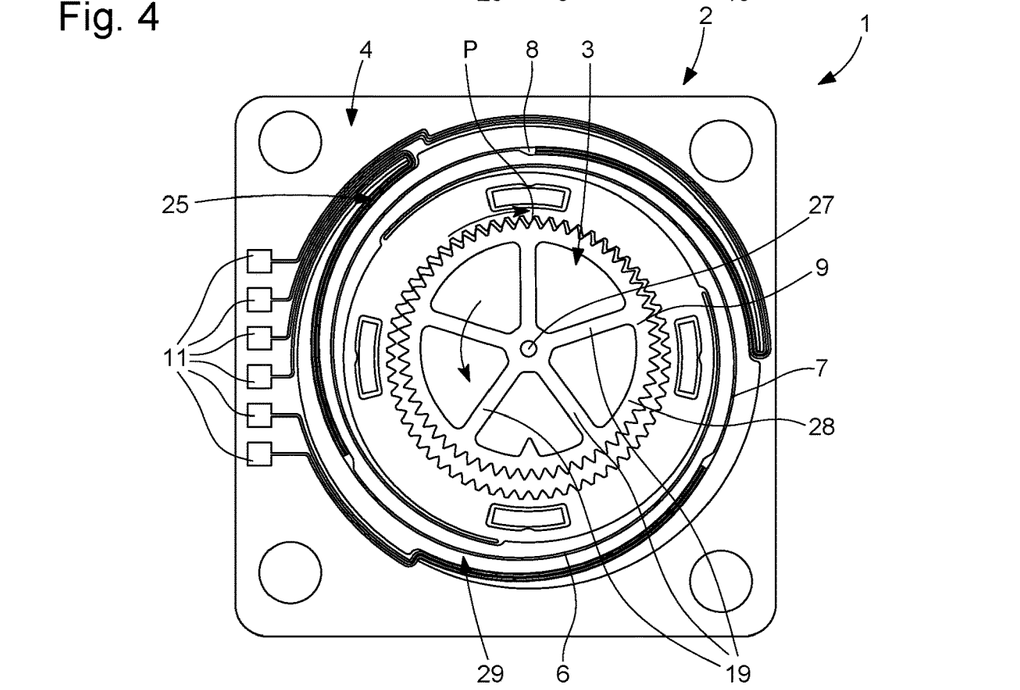
Figure 5:
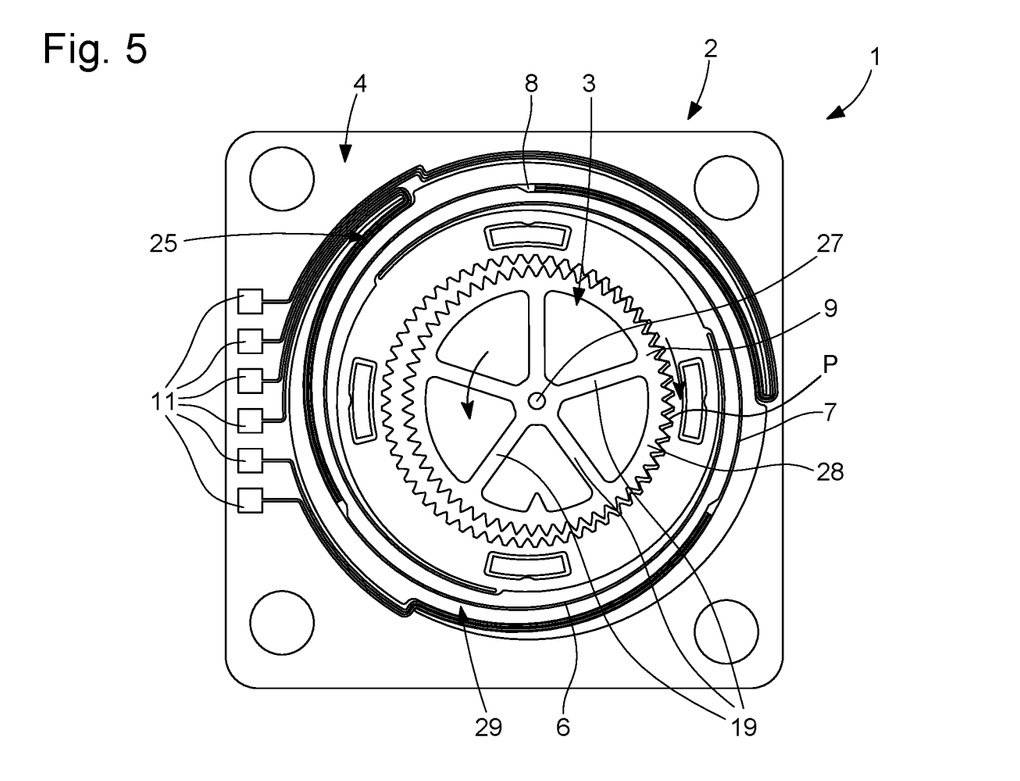

In FIG. 2, the movable element 5 is raised, so that the point of contact P is at the bottom of the toothed wheel 9, namely at 6 o'clock. In FIG. 3, the movable element 5 is shifted to the right, so that the point of contact P is to the left of the toothed wheel 9, namely at 9 o'clock. Then, the movable element 5 is lowered, so that the point of contact P is at the top of the toothed wheel 9, namely at 12 o'clock, as shown in FIG. 4. Finally, in FIG. 5, the movable element 5 is shifted to the left, so that the point of contact P is to the right of the toothed wheel 9, namely at 3 o'clock. From one figure to the next one, the movable element 5 has performed an orbital motion by a quarter-turn.

The movable element 5 gets away from the rotor 3 so as to no longer be in contact with the rotor 3, when the movable element 5 rotates in the reverse direction, as shown in FIG. 1. Thus, the rotational motion is not transmitted to the rotor 3 in the other direction, and the rotor 3 rotates only in one direction.

For example, the toothing 10 of the rotor 3 comprises 56 teeth, whereas the toothing 12 of the movable element 5 comprises 60 teeth. Thus, the reduction factor r between the speed of the point of contact and the speed of the rotor is given by $$r = \frac{Zm - Zr}{Zr}$$

where Zm refers to the number of teeth of the movable element 5, and Zr refers to the number of teeth of the rotor 3. Thus, in our example, $$r = \frac{60 - 56}{56} = \frac{1}{14}.$$

This reduction is advantageous because it is directly integrated to the motor, thereby reducing the number of additional reduction geartrains needed to drive a hand for example.

Preferably, at least one tooth of the toothing 10 of the rotor 3 is in contact with the toothing 12 of the movable element 5 to transmit the motion. Thus, the risk of blockage of the rotor 3 is avoided. It is possible to size the movable element 5 and the rotor 3 so that only one tooth of the toothing 10 is in contact with the toothing 12 of the rotor 3.

Preferably, direct electrical voltages are individually applied to each of the arms 6, 7, 8, which causes a movement of the centre of oscillation of the movable element 5, in order to compensate for a possible natural decentring, and thus increase the efficiency of the motor 1.

Preferably, the amplitudes of the alternating voltages applied to the arms 6, 7, 8 able to make the movable element 5 oscillate are variable so as to make the oscillation of the movable element 5 perfectly circular, in order to compensate for a possible natural ovalisation of the trajectory, and thus also increase the efficiency of the motor 1.

If it is desired to make the rotor 3 rotate in the other direction, all it needs is to reverse the polarities of the electrical voltages applied to the resonator. Thus, the motion of the arms 6, 7, 8 causes the rotation of the movable element 5 of the stator 2 in the other direction. In the case of the actuation of an analogue display, this allows setting the position of the hands in both directions.

In the case of a watch, the resonance frequency or natural frequency of the motor 1 is adapted to the frequency of the quartz, which is intended to set the working of the movement. An excitation frequency corresponding to a submultiple of the frequency of the quartz, which is generally 32,764 Hz, is selected. For example, a frequency of 128 Hz is selected. Preferably, the frequency of the motor 1 is adjusted and tuned with the excitation frequency so that its oscillation amplitude does not fall below 90-95% of the maximum amplitude.

Figure 6:
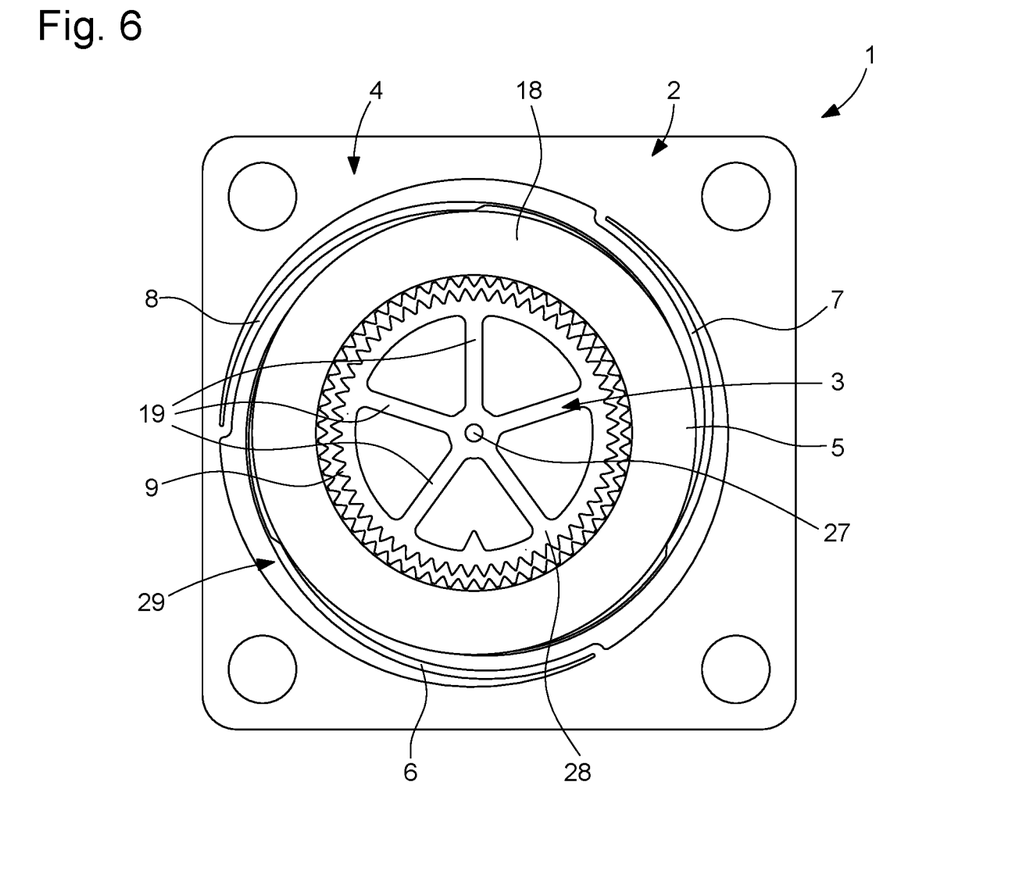
Figure 7:
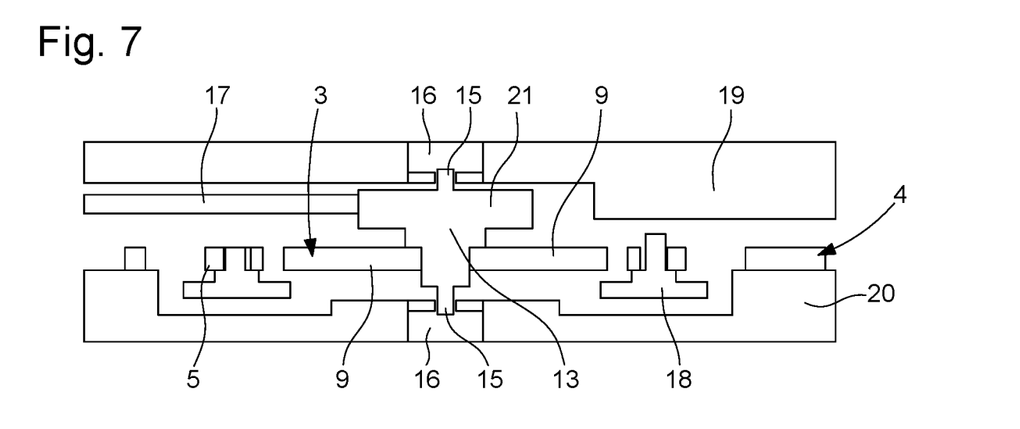

The frequency is adapted by modifying the mass of the movable element 5 and/or the stiffness of the arms 6, 7, 8. For example, it is possible to assemble a ring 18 beneath the movable element 5 to weigh it down in order to lower its oscillation frequency. For example, the ring 18 comprises nickel silver, preferably completely.

To increase the frequency, it is possible to lighten it by removing material, for example by means of a laser or by milling. Since these processes allow for a very accurate adjustment, they will be preferably used to tune the motor with the quartz.

The resonance peak of the motor coupled to its load is sized so as to be high enough, namely much higher than that of the quartz. This is why it is possible to slightly vary the speed of the motor by changing its excitation frequency, without losing much amplitude, for example to compensate for a rate loss following an impact or any other disturbance, in order to align the quartz time base again with the position of the hands.

Figure 8:
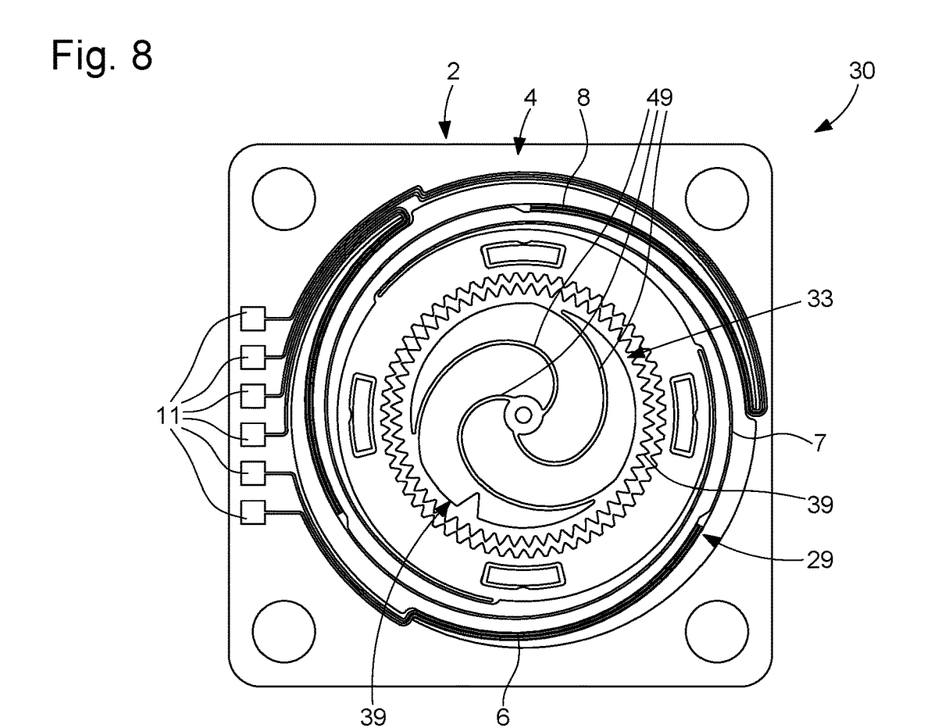
Figure 9:
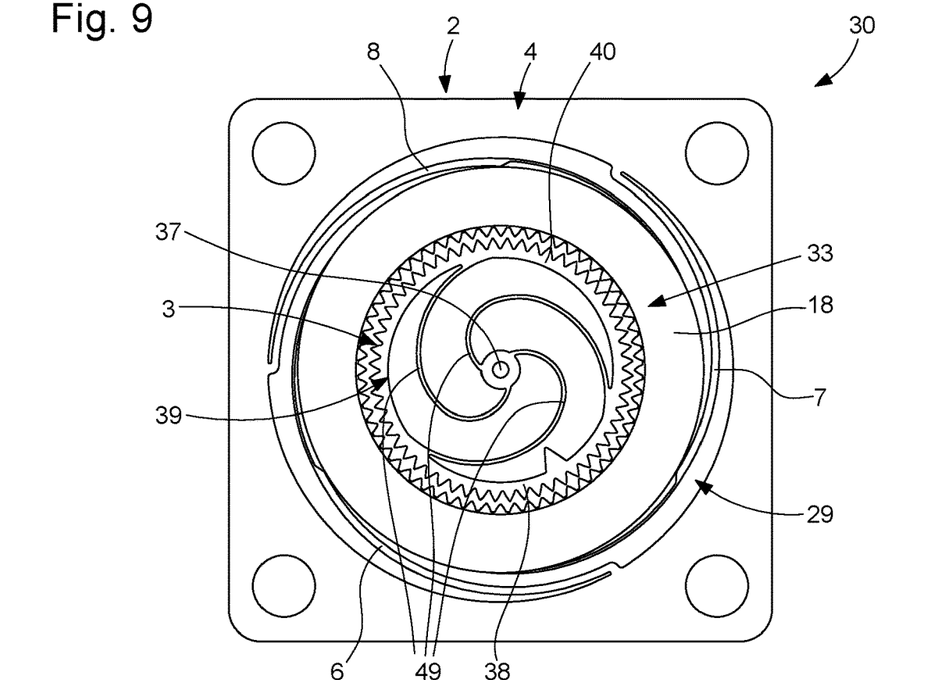

FIGS. 8 and 9 show a second embodiment of a piezoelectric motor 30 similar to the first embodiment. The difference is that the rotor 3 is provided with damping means. The wheel 9 of the rotor 3 comprises flexible blades 49 connecting a ring 38 carrying the outer toothing 40 and the hub 37. In this embodiment, the rotor 3 is provided with three flexible blades 49 angularly distributed in the wheel of the rotor. Each describes a spiral-like circle arc portion.

Thus, by their deformation, the flexible blades 49 absorb the impacts exerted on the rotor 3, if the motor 30 is violently shook. The wheel 39 is soft to avoid transmitting the impact to the axis. The bearings of the axis may also include additional damping means, like in the first embodiment.

Figure 10:
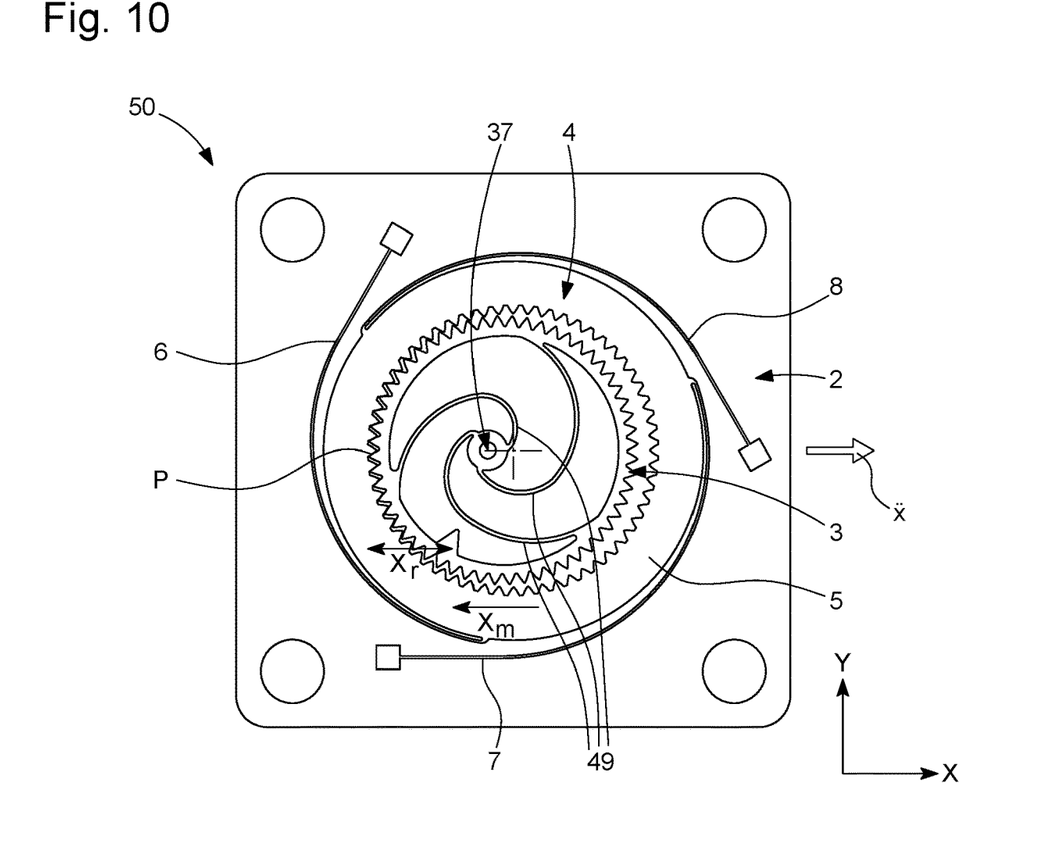

FIG. 10 shows a third embodiment of a piezoelectric motor 50 similar to the second embodiment, for which an impact is applied to the fixed element 4 of the stator 2 during the operation of the piezoelectric motor 50. The impact produces an acceleration $\ddot{X}$ the direction indicated by the arrow, which leads the movable element 5 to move by $X_m$ in the direction opposite to the arrow, and thus to disengage from the rotor 3. However, thanks to the deformation of the flexible blades 49 of the rotor 3, the latter also moves by $X_r$, in the same direction as the movable element 5. Thus, the rotor 3 remains in contact with the movable element 5, in order to be geared despite the impact. The mass of the rotor 3 and the elasticity of the flexible blades 49 enable the rotor 3 to follow the same trajectory as the movable element 5. Thus, the gearing and the orbital motion of the movable element 5 are preserved.

Figure 11:
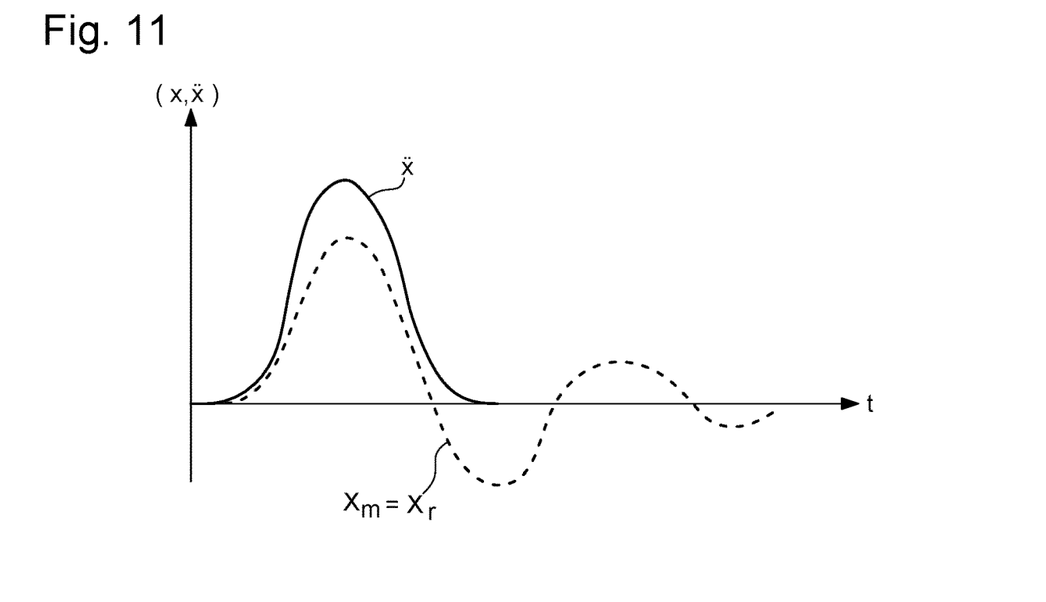
FIG. 11 is a graph on which are represented the acceleration due to an impact on the piezoelectric motor, as well as the movement of the toothed wheel.

In the graph of FIG. 11, the acceleration $\ddot{X}$, due to the impact applied horizontally from left to right, follows an impact curve or wave representing the acceleration $\ddot{X}$. The movement $X_m$ of the movable element 5 and $X_r$ of the rotor 3 follows a damping curve which follows the curve.

Advantageously, the masses of the rotor 3 and of the movable element 5, as well as the stiffnesses of the flexible arms 49 of the rotor 3 in the direction of the impact, and of the flexible arms 6, 7, 8 of the movable portion 5, are selected so that the trajectories $X_m$ and $X_r$ are coincident.

In this embodiment, the impact is applied according to the axis X. Yet an impact might of course be applied in any direction of the plane X, Y, while keeping gearing of the rotor 3 and of the movable element 5.

Advantageously, the masses of the rotor 3 and of the movable element 5, and respectively the stiffnesses of the flexible arms 49 of the rotor 3 in the direction of the impact, and of the flexible arms 6, 7, 8 of the movable portion 5, are selected so as to preserve the gearing contact between the rotor 3 and the movable element 5, regardless of the direction and the intensity of the impact.

In a fourth embodiment, not represented in the figures, of a piezoelectric motor similar to all of the previous embodiments, the impact is electronically detected by means of the piezoelectric voltages induced in the arms 6, 7, 8. For example, during the operation of the motor 1, 30, one of the arms 6, 7, 8 may be temporarily toggled from the actuator mode into the detector mode via a transistor of detection means. Thus, the detection means cyclically detect whether there is an impact over a third of the duration of the turn of the gearing point. Where appropriate, it may perform a correction of the next excitation signals, for example through a temporal increase of the amplitudes of the applied alternating voltages to force contact during and after the impact.

It should be understood that various modifications and/or improvements and/or combinations that are obvious to a person skilled in the art may be made on the different embodiments of the invention disclosed hereinabove, without departing from the scope of the invention defined by the appended claims.

The invention claimed is:

1. A rotary piezoelectric motor, in particular for a timepiece, the rotary piezoelectric motor comprising:
   a rotor configured to be able to rotate and actuate a mechanical device; and
   a stator configured to make the rotor rotate, the stator comprising a piezoelectric actuator provided with a resonator arranged to perform an oscillatory motion,
   wherein the stator comprises a fixed element and the resonator comprises a movable element arranged at a distance from the fixed element and connected to the fixed element, the piezoelectric actuator being configured to move the movable element against the rotor to cause the rotor to rotate in a first direction.

2. The rotary piezoelectric motor according to claim 1, wherein the resonator comprises a plurality of flexible arms, connected by one end to the fixed element of the stator, and by another end to the movable element of the stator, angularly distributed around the movable element.

3. The rotary piezoelectric motor according to claim 1, wherein the movable element performs an orbital motion in a second direction opposite to the first direction.

4. The rotary piezoelectric motor according to claim 1, wherein the movable element is always in contact with the rotor during the operation of the rotary motor.

5. The rotary piezoelectric motor according to claim 3, wherein the movement of the movable element makes the rotor rotate continuously.

6. The rotary piezoelectric motor according to claim 1, wherein the movable element has a ring-like shape, the rotor being arranged inside the ring.

7. The rotary piezoelectric motor according to claim 4, wherein the contact between the movable element and the movable rotor is inside the ring.

8. The rotary piezoelectric motor according to claim 6, wherein the rotor comprises a toothed wheel, the ring including an inner toothing cooperating with an outer toothing of the toothed wheel.

9. The rotary piezoelectric motor according to claim 1, wherein the movable element is immovable in rotation on itself.

10. The rotary piezoelectric motor according to claim 2, wherein the flexible arms perform a radial back-and-forth motion so as to make the movable element oscillate and move it.

11. The rotary piezoelectric motor according to claim 1, wherein the movable element is arranged around the rotor.

12. The rotary piezoelectric motor according to claim 1, wherein the rotor and/or the stator is obtained by micromachining from silicon or metal.

13. The rotary piezoelectric motor according to claim 2, further comprising means for constant or temporal adjustment of the mechanical tension of each arm by a direct offset electrical voltage or by modification of the amplitude of alternating electrical voltages.

14. The rotary piezoelectric motor according to claim 2, wherein the flexible arms are actuated by a signal phase-shifted by $$\frac{2\pi}{N}$$

between two consecutive flexible arms, N being the number of flexible arms.

15. The rotary piezoelectric motor according to claim 1, wherein the resonator oscillates at a frequency corresponding to its natural frequency.

16. The rotary piezoelectric motor according to claim 1, wherein the rotor comprises flexible blades for holding gearing with the movable element in the event of an impact.

17. A timepiece including a horological movement comprising a gear transmission configured to make at least one hand rotate, wherein the timepiece comprises the rotary piezoelectric motor according to claim 1, the rotary piezoelectric motor being arranged so as to actuate the gear transmission.

* * * * *